June 15, 1954     S. E. NAPIER ET AL     2,680,927
FISH LURE
Filed April 6, 1948
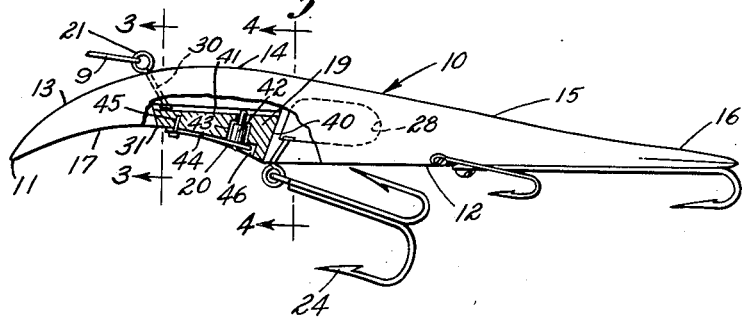
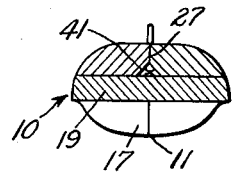
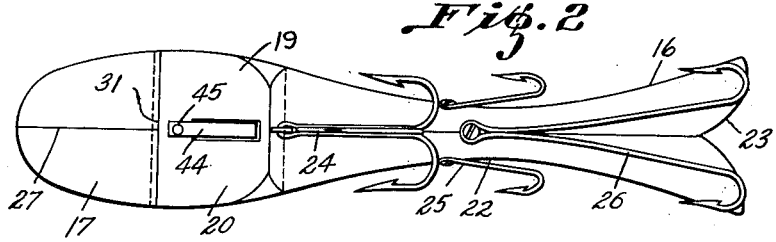
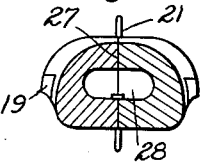
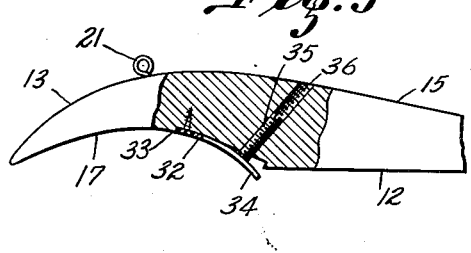
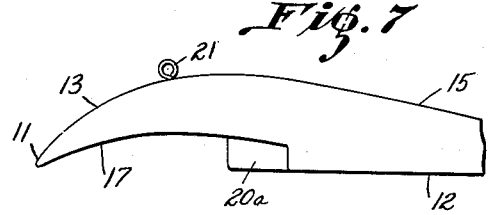
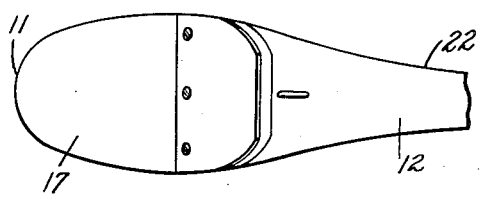
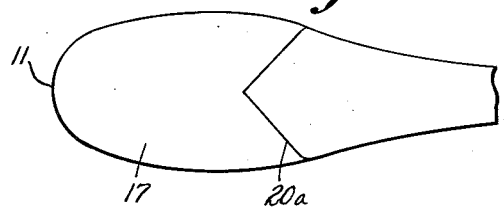
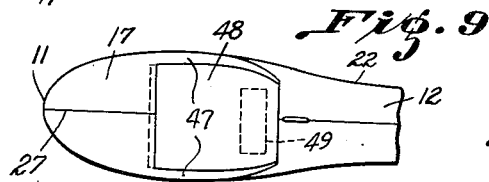
Inventors:
STEPHEN E. NAPIER
AND JOHN PLASKON
BY *Attorney*

Patented June 15, 1954

2,680,927

UNITED STATES PATENT OFFICE 2,680,927

FISH LURE

Stephen E. Napier and John Plaskon, Chicago, Ill.

Application April 6, 1948, Serial No. 21,224

14 Claims. (Cl. 43—42.22)

The present invention relates to fishing lures and has for one of its objects the provision of a plug whose performance and appearance, when cast or trolled, are those of its live counterpart at the speeds normally employed by the counterparts in their feeding and migration habits.

Heretofore, lures have been provided to cavort in the water when trolled or cast. Most of them merely function to attract attention in an endeavor to arouse the curiosity of the game fish or its fighting instincts with the hope that a strike or an entanglement with a hook on the lure will follow. In some instances lures have outrigger hook supports on them and are caused to gyrate wildly in the hope of gaffing unwary fish coming too close in their curiosity or those who do not flee from the trolling or retrieving path.

Although the ultimate desire of any angler is to hook a fish by whatever legal means he can, it would appear that the more the lure is like natural food in its appearance and actions the greater is the likelihood of a full strike, the capture of the fish, and the avoidance of an injured escape. Of course, curiosity has something to do with a fish rising to a lure occasionally, and a fish may nibble at a lure testily, but such a rising or nibbling indicates that the lure does not deceive but merely intrigues the game because if a fish is convinced that an object is food when it first sees it, it generally strikes quickly with open mouth to engorge it as a matter of natural reaction.

The present invention provides a lure which in relationship to its size and shape, sweeps, dives or ranges in the water in a manner closely akin to fish of the same size, when retrieved or trolled at comparable speeds.

The invention is also characterized by being adaptable by adjustment or insertion or manipulation to the personal likes or habits of individual anglers so that change from moderate to rapid action can be accomplished without disconnecting the lure from the line.

A further object of the invention resides in a lure provided with any degree of buoyancy including negative degrees and which is able to submerge deeply even with fast trolling or fast retrieve, or run shallow with a slow trolling or retrieve.

The invention is further characterized by a wide range of lifelike action controlled by variation in the trolling or retrieving speed including looping for surfacing under quick acceleration.

The invention is also characterized by sufficient lifelike look and performance that fish strike with vigor and purpose so that the overall width of the hook array can be confined close to the body of the lure to reduce the hazard of entanglement with inanimate objects.

A further object of the invention is to provide a lure which when under water without benefit of bubbles to conceal its contour is lifelike to the game in its appearance as well as lifelike in its performance.

Another object of the invention is the provision of a shape and construction which is easily molded from a plastic material or stamped from metal, and which can be provided with a predetermined amount of buoyancy or a predetermined center of buoyancy at a point different from or the same as that of wooden plugs of like shape whereby allowance can be made for location and weight of the hook array.

The invention also contemplates a lure of the plug type which is strong and durable, easy to manage, and simple in construction and operation.

These being among the objects of the invention, other and further objects will appear from the drawing, the description relating thereto, and the appended claims.

Referring now to the drawing,

Fig. 1 is a side elevation of a preferred embodiment of the invention;

Fig. 2 is a bottom view of the embodiment shown in Fig. 1;

Fig. 3 is a section taken upon line 3—3 of Fig. 1;

Fig. 4 is a section taken upon line 4—4 of Fig. 1;

Fig. 5 is a side elevation partly in section of a modification of the embodiment shown in Fig. 1;

Fig. 6 is a bottom view of the modification shown in Fig. 5;

Fig. 7 is a side elevation of another modification of the device shown in Fig. 1;

Fig. 8 is a bottom view of the modification shown in Fig. 7; and

Fig. 9 is a bottom view of another modification of the invention.

Fish lures embodying the invention are characterized in part by presenting in a horizontal plane the general silhouette outline of a fish taken in a vertical plane with the bottom recessed upwardly behind the nose for about a third of its length.

The top of the body is arched upwardly from the nose for approximately one-third of its length and tapers or drops rearwardly and downwardly over the remaining portion where a tail portion is preferably provided which is spread laterally in a horizontal plane. An upwardly arched recess beginning just behind the nose preferably terminates at a point approximately below the highest point of the upwardly arched upper surface in a shoulder or downwardly inclined surface hereinafter sometimes referred to as the reaction surface. The tow eyelet for the lure is located forwardly of the reaction surface and at approximately the level of the top of the body. Hooks may be suitably located just behind the reaction surface along the sides and beneath the tail portion.

More particularly, the lure comprises a body portion 10 which, in Fig. 1, is shown preferably made out of plastic. The nose is indicated at 11 and preferably is at approximately the level of the lowermost or rear bottom face portion 12 of the body. From this point the upper surface of the body arches upwardly and rearwardly as indicated at 13 to a point 14 which is approximately one-third the way back from the nose 11. From this point the body slopes downwardly along the line 15 to the tail portion 16. Beneath the upwardly arched portion 13 a recess 17 is provided of a depth approximately one-half or less than the height of the body portion. From its maximum height the recess sweeps downwardly to form a shoulder as at 20 which may be of any one of several configurations. This shoulder and much of the performance characteristics of the lure depend upon the sharpness with which this shoulder approaches the lower plane 12 of the lure. At approximately the full height of the recess 17 an eyelet 21 is provided to receive a leader 9, and the effective pulling point of this eyelet is preferably disposed at approximately the same level as the top of the lure.

As viewed in Fig. 2, the widest part of the lure can be located anywhere along the body from the full height of the recess 17 to the astern edge of the reaction surface from which location it tapers back to a waist portion 22 located about two-thirds the distance back upon the body and again flares outwardly to provide the tail 16 of a width approximately the same width as the front portion, the tail being otherwise conformed or notched as at 23 at the rear end to simulate a fishtail.

The hooks may be located upon the body in any position desired, but it is preferred to provide a triple hook 24 just behind the border of the reaction surface, two short single hooks 25 at the bottom sides of the waist, and a long double hook 26 secured to the body at the waist with elongated hook portions disposed and concealed under the tail spread.

Referring to Fig. 3, the body is made up of two halves as separated upon a medial vertical plane such as represented by the line 27. In the thick body portion just above the triple hook 24, wells 28 can be provided in the halves symmetrically opposite each other. Then when the two halves are joined together a sealed hollowness is provided by the well spaces to buoy the weight of the hooks and preferably float the body when the body is dropped in the water. The two halves are secured together by an adhesive under pressure and when adhering them it is preferred that the shank 30 of the eyelet be imbedded therein along the medial plane where it is held solidly against withdrawal by a head 31 at its lower end either imbedded in the plastic or exposed on the surface in the recess 17.

The screws which support the hooks are preferably wood screws tightened into holes formed by drilling the body at suitable points.

The body may be painted in any colors and patterns desired. The head portion can be painted red and the tail portion white, but it is preferred to paint the body a silver luminous paint color all over to accentuate the fish-like contour of the lure, and in those instances where a translucent plastic is used the hollowness may be lined with luminous paint.

The arched upper forward surface of the nose or front portion of the body is preferably rounded in horizontal planes to streamline the body for movement through the water, yet provide an effective prow or entry surface which causes the lure to dive when a horizontal forward pull is exerted upon it at the eyelet. This diving action, however, is controlled by the horizontal expanse of the tail 16 which prevents the lure from nosing over and diving too rapidly.

This diving action is somewhat augmented also by the drag exerted in the water by the forward portion of the recess 17. The water flowing past the nose 11 has a tendency to continue in a straight line but due to displacement present at the nose 13 there is a suction or vacuum effect behind the nose in the recess. The diving that takes place, consequently, is controlled by the tail width, the rate of forward motion, the recess drag, and the buoyancy of the lure. The tail 16 is so constructed and arranged that diving of the lure is preferably gradually inclined.

The water passing under the nose swirls into the path of the reaction surface 20 and tends to obstruct or resist the forward movement of the lure. Although this reaction surface preferably is wider and extends laterally beyond the nose width, this is not essential if the inclination of the reaction surface is increased. Water striking the reaction surface causes the lure to sidle first in one direction and then another when drawn forwardly by the angler through the water. As the lure moves first in one direction and then in another it rocks slightly back and forth to escape the pressure of the water upon the reaction surface. The steeper the reaction surface is inclined, the greater will be the rapidity and the smaller will be the amplitude of the oscillatory sidling action.

As more particularly shown in Figs. 1, 2 and 3, the degree or inclination of the reaction surface can be changed by providing replaceable inserts 19 having different reaction surface 20 characteristics. In order to do this, the body is preferably provided with a transverse dovetail groove 40 and the inserts 19 having contours mating therewith are slid sidewise into place. The inserts are held releasably in place by a snap or detent arrangement in which a longitudinal detent groove 41 is provided at the line of joinder 27 and a pin 42 mounted in a well 43 in the insert is urged upwardly into the detent by a leaf spring 44 secured to the insert by rivets 45 with the free end disposed against the pin as guided by side walls 46 of a narrow cut in the reaction surface.

It is preferred that the detent be located towards the side of the insert nearest the deeper dovetail wall so that the insert is more surely held in place against inadvertent dislodgment. Interchangeable inserts can be provided with a wide range of reaction surface contours of varying inclination up to vertical walls arranged in one or more steps and including any compounding of curves both convex and concave on the reaction surface. In fact, the inserts can be furnished as blanks, if desired, which can be carved by purchasers according to their own likes and dislikes.

Referring to Fig. 5 it will be observed that a flexing plate 32 is provided in the recess 17 as secured in place by screws 33 along the front edge thereof. The free trailing edge 34 is raised and lowered by a setscrew 35 adjustable through a threaded opening 36 opening upon the back of the lure. As the screw 35 is turned inwardly, the trailing edge 34 is forced downwardly to provide an adjustable reaction surface which varies the sidling action of the lure in relationship to the adjustment. The plate is preferably thinner at its trailing portion so that an increasingly sharper curve can be induced by the adjustment, and it has been noted that the oscillatory sidling of the lure is assisted by the rear edge of the plate 32 moving below the lower plane 12 of the lure as it is adjusted.

In Fig. 7 another modification of the reaction surface is illustrated in which a right angled V-shaped wall is provided. This wall is preferably more obtuse than a right angle even to the point of being straight across, but it is preferred to have some angularity in the wall so that the sidling action is carried on in relationship to the alternate planing actions of each side of the reaction wall as the lure is drawn through the water. For instance, if the lure is being drawn forwardly by the angler and it is moving to the left, the right-hand side of the reaction surface as viewed from the angler is planing in the water with the other side obstructing forward motion until such time as the angle between the lure and the line is such that the lure is tilted in the other direction so that the left-hand side of the planing surface causes it to move to the right. This tilting action permits the reaction surface of the water to be stronger on the tilted outer side of the lure as it sweeps back and forth through the water until the angularity between the line and the lure causes the lure to seek another line of forward motion due to the preponderance of the reaction of the high side.

It has been discovered, and it will be seen from the description just made, that if the reaction surface is vertical and straight across, the zigzagging will be more rapid than normally experienced with a live fish of the same size. Thus the ability to imitate the action of live bait is well within the limits of adjustability of the invention. Therefore, if the wall is square, then it should be rounded or angled at the sides to permit the water to spill away somewhat without a full force of reaction upon the reaction surface if the slower sweeping action of a fish is to be imitated. However, this spill-away of reaction water is automatically taken care of if the reaction wall is inclined. Therefore, between these elements the rapidity with which the lure moves sidewise back and forth in the water can be determined or controlled, depending upon the live bait which the lure is intended to imitate.

As the lure sidles it tilts sidewise slightly as already mentioned. Thus it has the advantage that its plan outline approaches the silhouette of a fish if viewed in water from the bottom of the body of water. It is further to be noted that the tail 16 is thin in a vertical direction. This permits the tail to sidle laterally also with the bait to permit the back and forth motion of the lure, yet keeps the lure headed forwardly.

Thus the lure's lateral movement and its sidling rapidity is determined by the depth of the recess 17 and the reaction surface, the driving propensity of the lure being augmented by its upwardly curved nose which serves also to provide sufficient stock and clearance behind the nose for the recess without weakening as regards withstanding impacts against stationary objects in the water. Not only this, but the diving propensity of the lure serves to augment lateral sweep from a direct line of pull on the leader when the bait sidles and tilts.

In operation, when the lure is cast by the angler it is preferably provided with sufficient buoyancy that it floats partly out of the water with the nose submerged, then when the angler pulls forwardly the nose is forced downwardly on an inclined dive with the reaction surface causing the lure to swing laterally back and forth two or three feet from the center line of the troll or retrieve path. Relaxation upon the line will cause the lure to buoy upwardly if buoyant or downwardly if it is a sinker, and the angler can determine by the speed of retrieve the depth to which the lure goes in its movement. If the lateral sweeps do not take place with sufficient rapidity a different lure or insert can be used having a steeper reaction surface, or the embodiment illustrated in Fig. 5 can be tightened down to drive the reaction surface downwardly to increase this rapidity. Whenever the pull is relaxed or stopped, the lure surfaces with a gradual upward floating action.

With this arrangement the lateral ducking movement of a fish being pursued by a larger one is imitated and any large fish nearby will make an effort to capture the lure for food purposes. The lateral sweeping movement induces the game fish to strike rapidly and hard so that there is no danger of the game fish missing the bait as it ducks back and forth laterally. With this arrangement the game fish cannot nibble at the lure nor trail it without seriously intending to engorge it.

Some game fish have the habit of striking their food from the side and stunning it before engorging it. In these instances an angler sensing that the plug has been struck can slow down his reeling and permit the action of the lure to lapse into quiescence, later teasing it forwardly again if the game fish does not come back to engorge it.

Referring to Fig. 9, a further embodiment is illustrated in which the lure is hollowed out over the reaction surface in a way similar to Fig. 1 but preferably with side walls 47 left to define a cavity. This cavity receives a body of pliant material 48 such as electrician's putty, tallow, asphalt or nonmiscible synthetic or natural resins having a softening range above the normal temperature of surface water, namely above 70° F. It is preferred, but not necessary with certain materials, to encase them in an elastomer bag for use as an insert unit so that the material when left in place will not run over other articles in the tackle box under some summer temperatures to which the box is subjected.

The material is pressed as an insert into the cavity and manipulated to provide the desired reaction surface contour, and this contour can be changed from time to time by further manipulation, the insert holding its shape while in use in the water since the material used is preferably not soft enough that the water action would cause changes.

Buoyancy can be varied at will by embedding a buoyant element 49 such as a block of balsa wood in the mastic and moving it around until the desired center of buoyancy is attained, or a buoyant material such as ground cork or kapok may be kneaded into the mastic.

To a fish eyeing the lure from underneath against the rippling background of the water surface, the lure appears to be food fish swimming along looking for something to eat if it is drawn slowly by the angler or if retrieved more rapidly by the angler its lateral movement will portray a fish being chased or in fear for its life. The lifelike appearance of the lure moving in such a characteristic manner will more readily cause the game fish to strike it with the intention of engorging it, thereby assuring that the hooks on the lure will be deep set in the fish's mouth so that it will not shake itself loose from the lure while being played by the angler.

Having thus described the invention and several preferred embodiments thereof, the principles of operation and special characteristics accomplishing the objects stated, it will be readily apparent to those skilled in the art that various and further modifications can be made without departing from the invention, the scope of which is commensurate with the appended claims.

What is claimed is:

1. A fish lure comprising a body defining in plan view the general silhouette outline of a fish having an elongated somewhat fusiform shape widest at a point approximately one-third the way back from the nose thereof and terminating at the tail end in a broad caudal fin tapering in a vertical plane with a gradually decreasing dimension from said widest point to said tail end and provided with an upwardly arched recess on the bottom of the body beginning just behind the nose and extending rearwardly approximately one-third the length of the body where it ends in a downwardly and rearwardly inclined reaction surface said recess being the highest at approximately the widest part of the body, and means for attaching a line to the top of said body at a point spaced approximately one-sixth of the length of the body from the nose thereof.

2. The fish lure called for in claim 1 in which the top of the forward one-third of the body is arched upwardly from the nose along a surface curved convexly in both the longitudinal and horizontally transverse dimensions of the body.

3. A fish lure comprising a body having in plan view approximately the side silhouette of a fish rounded at the front end to the widest portion of the body approximately one-third the way back on the body, a series of hooks mounted on the bottom of the body and said body having a recess in the bottom side which begins just behind the nose and extends rearwardly approximately one-third the length of the body where it ends in a downwardly and rearwardly inclined reaction surface, said reaction surface being defined by a flexible member, and means for flexing said member downwardly, the most advanced hook on said lure being secured to the underside astern of said recess.

4. A fish lure comprising a body having an upwardly inclined top forward portion rounded at the front end to the widest portion of the body approximately one-third the way back on the body, said body having a recess upon the bottom side below said upwardly inclined portion terminating within the forward half of the body, a movable member mounted within the rear half of said recess and defining a forwardly presenting reaction surface inclined rearwardly, and means for adjusting the inclined position of said member.

5. A lure including a body having an upwardly arched forward portion and an approximately flat bottom portion aft said forward portion, means for towing said lure at a point of fastening on said upwardly arched portion, an upwardly arched recess in the bottom of said forward portion, an insert detachably received in said recess astern said towing means defining on its forward face a water reaction surface extending downwardly and rearwardly.

6. The lure defined in claim 5 in which the insert is a flexing plate mounted at one edge and means is included for raising and lowering a portion of the plate over an area spaced from said mounted edge.

7. The lure defined in claim 5 in which the insert is an element comprising a moldable material essentially pliable at room temperature and a flexible covering therefor.

8. The lure called for in claim 5 in which the insert comprises a moldable material essentially pliable at room temperature having a buoyant material mixed therewith and a flexible covering therefor.

9. The lure called for in claim 5 in which the insert is a replaceable block having a predetermined reaction surface contour upon its water reaction surface.

10. A fish lure including a body having an upwardly arched forward portion extending from the nose to the widest portion of the body approximately one-third the way back on the body and an upwardly arched recess on the bottom of the body beginning just behind the nose and extending rearwardly approximately one-third the length of the body, said body terminating at the tail end in a broad caudal fin tapering in a vertical plane with a gradually decreasing dimension from said widest portion to said tail end, and a movable insert detachably received within the rear half of said recess and defining on its forward face a water reaction surface extending downwardly and rearwardly.

11. The lure defined in claim 10 in which the insert is a flexing plate and means is included for raising and lowering a portion of the plate over an area spaced from the forward edge of the plate.

12. The lure defined in claim 10 in which the insert is an element comprising a moldable material essentially pliable at room temperature and a flexible covering therefor.

13. The lure called for in claim 10 in which the insert comprises a moldable material essentially pliable at room temperature having a buoyant material mixed therewith and a flexible covering therefor.

14. The lure called for in claim 10 in which the insert is a replaceable block having a predetermined reaction surface contour upon its water reaction surface.

References Cited in the file of this patent

UNITED STATES PATENTS

| Number | Name | Date |
|---|---|---|
| 1,101,223 | Welles | June 23, 1914 |
| 1,220,921 | Wilson | Mar. 27, 1917 |
| 1,331,618 | Brown | Feb. 24, 1920 |
| 1,423,025 | Rodgers et al. | July 18, 1922 |
| 1,551,677 | Malfet | Sept. 1, 1925 |
| 1,744,366 | Davenport | Jan. 21, 1930 |
| 1,855,097 | Chamberlaine | Apr. 19, 1932 |
| 1,893,686 | Schlipp | Jan. 10, 1933 |
| 2,525,733 | Suick | Oct. 10, 1950 |